: United States Patent (10) Patent No.: US 8,346,100 B2
Cerisola et al. (45) Date of Patent: Jan. 1, 2013

(54) APPARATUS AND METHOD FOR MONITORING RECEIVED OPTICAL POWER IN AN OPTICAL RECEIVER OVER A WIDE RANGE OF RECEIVED POWER WITH HIGH ACCURACY

(75) Inventors: Mauro Cerisola, Turin (IT); Michela Franz, Turin (IT)

(73) Assignee: Avago Technologies Fiber IP (Singapore) Pte. Ltd, Singapore (SG)

( * ) Notice: Subject to any disclaimer, the term of this patent is extended or adjusted under 35 U.S.C. 154(b) by 569 days.

(21) Appl. No.: 12/577,248

(22) Filed: Oct. 12, 2009

(65) Prior Publication Data

US 2011/0085800 A1 Apr. 14, 2011

(51) Int. Cl.
*H04B 10/06* (2006.01)
*H04B 10/08* (2006.01)
(52) U.S. Cl. .......................................... 398/209; 398/38
(58) Field of Classification Search ............... 398/33, 398/202–204, 208, 209, 38
See application file for complete search history.

(56) References Cited

U.S. PATENT DOCUMENTS

| | | | |
|---|---|---|---|
| 6,373,334 B1 | 4/2002 | Melanson | |
| 6,819,710 B1 | 11/2004 | Dupuis | |
| 7,426,154 B2 | 9/2008 | Matsumoto et al. | |
| 7,620,317 B2 * | 11/2009 | Stewart et al. | 398/22 |
| 7,801,193 B2 * | 9/2010 | Yen | 372/38.1 |
| 7,881,608 B2 * | 2/2011 | Miller et al. | 398/25 |
| 2003/0016426 A1* | 1/2003 | Seong et al. | 359/194 |
| 2007/0127530 A1* | 6/2007 | Pan et al. | 372/38.02 |
| 2009/0096647 A1 | 4/2009 | Nazemi | |
| 2009/0167575 A1 | 7/2009 | Mitani et al. | |

* cited by examiner

*Primary Examiner* — Dalzid Singh

(57) ABSTRACT

A method and apparatus for use in an optical receiver are provided for monitoring the received optical power in the optical receiver over wide range of optical power levels with high accuracy. An adjustable resistor circuit of the apparatus has a first resistor and one or more second resistors that may be switched into and out of parallel with the first resistor to vary the resistance of the adjustable resistor circuit. A controller of the optical receiver controls the switching of the one or more second resistors into and out of parallel with the first resistor. Varying the resistance of the adjustable resistor circuit in this manner causes the value of the analog voltage signal representing the received optical power to be varied prior to being input to the ADC of the controller. In this way, the amplitude of the analog voltage signal is reduced when it is at the high end of the received power range so as not to exceed the input range of the ADC of the controller IC. When the amplitude of the analog voltage signal is at the lower end of the input range of the ADC, the amplitude of the analog voltage signal is not reduced. In this way, a wide range of received power is monitored with high accuracy.

12 Claims, 6 Drawing Sheets

APPARATUS AND METHOD FOR MONITORING RECEIVED OPTICAL POWER IN AN OPTICAL RECEIVER OVER A WIDE RANGE OF RECEIVED POWER WITH HIGH ACCURACY

TECHNICAL FIELD OF THE INVENTION

The invention relates to optical communications systems. More particularly, the invention relates to a method and an apparatus for monitoring received optical power in an optical receiver with high accuracy over a wide range of received power.

BACKGROUND OF THE INVENTION

FIG. 1 illustrates a block diagram of a parallel optical transceiver module 2 currently used in optical communications, which has multiple transmit and receive channels. The optical transceiver module 2 includes an optical transmitter 3 and an optical receiver 4. The optical transmitter 3 and the optical receiver 4 are controlled by a transceiver controller 6, which is typically an integrated circuit (IC) that performs various algorithms in the optical transceiver module 2.

The optical transmitter 3 includes a laser driver 11 and a plurality of laser diodes 12. The laser driver 11 receives an electrical data signal, Data In, and outputs electrical signals to the laser diodes 12 to modulate them. When the laser diodes 12 are modulated, they output optical data signals having power levels that correspond to logic 1 bits and logic 0 bits. An optics system (not shown) of the transceiver module 2 focuses the optical data signals produced by the laser diodes 12 into the ends of respective transmit optical fibers (not shown) held within a connector (not shown) that mates with the optical transceiver module 2.

Typically, a plurality of monitor photodiodes 14 monitor the output power levels of the respective laser diodes 12 and produce respective electrical feedback signals that are fed back to an average output power monitoring circuit 15. The average output power monitoring circuit 15 typically includes one or more amplifiers (not shown) that detect and amplify the electrical signals produced by the monitor photodiodes 14 to produce respective analog voltage signals, which are then input to the transceiver controller 6. The transceiver controller 6 includes analog-to-digital circuitry (ADC) (not shown) that converts the analog voltage signals into digital voltage signals suitable for being processed by the digital logic of the controller 6. The controller 6 performs an average output power monitoring algorithm that processes the respective digital voltage signals to obtain respective average output power levels for the respective laser diodes 12. The controller 6 then outputs control signals to the laser driver 11 that cause the laser driver 11 to adjust the bias and/or modulation current signals output to the respective laser diodes 12 such that the average output power levels of the laser diodes are maintained at relatively constant levels.

The optical receiver 4 includes a plurality of receive photodiodes 21 that receive incoming optical signals output from the ends of respective receive optical fibers (not shown) held in the connector. The optics system (not shown) of the transceiver module 2 mentioned above focuses the light output from the ends of the receive optical fibers onto the respective receive photodiodes 21. The receive photodiodes 21 convert the incoming optical signals into analog electrical current signals. The analog electrical current signals are then received by a received power monitoring circuit 25 of the optical receiver 4. The received power monitoring circuit 25 includes one or more amplifiers (not shown) that detect the analog electrical current signals produced by the receive photodiodes 21 and produce corresponding amplified analog voltage signals. An ADC of the controller 6 receives the amplified analog voltage signals and converts them into digital voltage signals suitable for being processed by the digital logic of the controller 6. The controller 6 performs a received power monitoring algorithm that processes the digital voltage signals to determine the received power levels.

FIG. 2 illustrates a block diagram of a portion 25a of the received power monitoring circuit 25 shown in FIG. 1 for processing the analog electrical current signals produced by one of the receive photodiodes 21. The portion 25a of the received power monitoring circuit 25 includes an amplifier 35, which is typically a current amplifier integrated in the high-speed Transimpedance Amplifier (TIA), and a resistor, $R_L$, 36, which is tied to ground, GND. The TIA 35 is a high-speed amplifier capable of detecting the high-speed electrical current signals produced by the receive photodiode 21 (FIG. 1). The TIA 35 produces an analog current signal, $I_{RSSI}$, which passes through $R_L$ 36 causing an analog voltage signal, $V_{MON}$, to be provided at the output of the received power monitoring circuit 25a. The analog voltage signal $V_{MON}$ is then sent to an input of the ADC 37 of the controller 6, which converts the analog voltage signal $V_{MON}$ into a multi-bit digital voltage signal. The controller 6 then processes this multi-bit digital voltage signal to determine the corresponding received power.

With reference to FIGS. 1 and 2, an accepted practice is to select the value of RL 36 such that the maximum $I_{RSSI}$ does not result in the maximum input range of the ADC (not shown) being exceeded, taking into account process spread for the gain of the TIA 35, the responsiveness of the photodiode 21 (FIG. 1), and optical coupling loss from the optical input (not shown) of the receiver 4 (FIG. 1) to the active area of the photodiode 21.

Optical transceivers are currently required to monitor and report the received power value. Typically, network equipment of the optical communications network polls the optical transceivers to obtain this information. Often, the network equipment causes the information to be displayed on a display device so that it can be viewed by a network operator. The information is sometimes used to determine whether a degradation of operating conditions has been detected, thereby allowing corrective actions to be taken, either before or after data has been lost. For example, a change in the received power may be an indication of a suspicious optical link, such as one having worn out connectors, strained optical fibers, etc. The network may then take actions to preserve the integrity of the data, such as, for example, routing the data to another link in the network.

Although FIG. 1 illustrates a parallel optical transceiver module, the description provided herein also applies to serial (i.e., non-parallel) transceivers, receivers and transmitters. Many equipment vendors now require that small form factor (SFF) optical transceiver modules monitor the received power with accuracy as high as 2 decibels (dB) over a range of power levels from a maximum allowed received power level corresponding to a power overload down to a minimum required power level corresponding to the minimum power level needed for the optical receiver to operate. For long-range optical links that use single-mode fiber with speeds of, for example, 10 gigabits per second (Gb/s), the range of received power levels that need to be monitored is from about +0.5 decibel-meters (dBm) down to about −18 dBm, with an accuracy that is better than 2 dB. The accuracy with which the received power can be monitored depends on the accuracy of the received power monitoring circuit and on the bit resolution of the ADC. In many cases, accommodating both the maximum input range in the ADC and the required power monitoring accuracy down to the minimum required received level can be a difficult or unachievable goal.

Accordingly, a need exists for a method and an apparatus for monitoring the received power in an optical receiver with high accuracy over a broad range of received power levels.

SUMMARY OF THE INVENTION

The invention is directed to a method and an apparatus for use in an optical receiver for monitoring a wide range of received optical power with very high accuracy. The apparatus comprises an amplifier circuit, an adjustable resistor circuit, and a controller. The amplifier circuit receives and amplifies an electrical signal produced by an optical detector in response to light received by the optical detector. The adjustable resistor circuit receives the amplified electrical signal at an input terminal of the adjustable resistor circuit and produces an analog voltage signal, $V_{MON}$, at an output terminal of the adjustable resistor circuit. The adjustable resistor circuit provides a resistance value that is adjustable between at least a first resistance value, $R_{L1}$, and a second resistance value, $R_{L2}$. The value of $R_{L1}$ is greater than the value of $R_{L2}$. The controller has an analog-to-digital converter (ADC) having an input port that receives the analog $V_{MON}$ signal and an output port that outputs a multi-bit digital value, $V_{MON\_DIG}$. The controller is configured to perform a received power monitoring (RPM) algorithm that analyzes the digital $V_{MON\_DIG}$ value output from the output port of the ADC to determine whether or not the digital $V_{MON\_DIG}$ value indicates that the resistance value provided by the adjustable resistor circuit needs to be adjusted. If the RPM algorithm determines that the digital $V_{MON\_DIG}$ value indicates that the resistance value of the adjustable resistor circuit needs to be adjusted, the RPM algorithm causes the adjustable resistor circuit to be adjusted to provide one of the first resistance value $R_{L1}$ and the second resistance value $R_{L2}$.

The method provides the following. In an amplifier circuit, an electrical signal produced by an optical detector in response to light received by the optical detector is received and amplified to produce an amplified electrical signal. In an adjustable resistor circuit, the amplified electrical signal is received at an input terminal of the adjustable resistor circuit, and the adjustable resistor circuit produces an analog voltage signal, $V_{MON}$, at an output terminal of the adjustable resistor circuit. The adjustable resistor circuit provides a resistance value that is adjustable between at least a first resistance value, $R_{L1}$, and a second resistance value, $R_{L2}$, where $R_{L1}$ is greater than $R_{L2}$. In a controller having an analog-to-digital converter (ADC), the analog $V_{MON}$ signal is received at an input port of the ADC, which converts the analog $V_{MON}$ signal into a multi-bit digital $V_{MON\_DIG}$ value. The multi-bit digital $V_{MON\_DIG}$ value is output from an output port of the ADC. In the controller, an RPM algorithm is performed that analyzes the digital $V_{MON\_DIG}$ value output from the output port of the ADC to determine whether or not the digital $V_{MON\_DIG}$ value indicates that the resistance value provided by the adjustable resistor circuit needs to be adjusted. If the RPM algorithm determines that the digital $V_{MON\_DIG}$ value indicates that the resistance value needs to be adjusted, the RPM algorithm causes the adjustable resistor circuit to be adjusted to provide one of the first resistance value $R_{L1}$ and the second resistance value $R_{L2}$.

These and other features and advantages of the invention will become apparent from the following description, drawings and claims.

DETAILED DESCRIPTION OF AN ILLUSTRATIVE EMBODIMENT

In accordance with the invention, an apparatus and a method are provided for monitoring received power in an optical receiver over a wide range of received power levels and with very high accuracy. In accordance with the invention, a received power monitoring circuit is provided that has one or more additional resistors that may be switched in and out of parallel with a load resistor, $R_{L1}$, to vary $V_{MON}$. Based on conditions detected by the controller IC of the optical receiver, the controller IC switches the resistor or resistors in or out of parallel with $R_{L1}$. In particular, when the value of $V_{MON}$ corresponds to the high end of the received power range, the controller IC causes the additional resistor or resistors to be placed in parallel with $R_{L1}$ to change the load resistance to an equivalent parallel resistor, $R_{L2}$, which decreases $V_{MON}$. A scaling factor is then multiplied by the resulting output of the ADC to compensate for the reduction in $V_{MON}$. When the value of $V_{MON}$ corresponds to the low end of the received power range, the controller IC prevents the additional resistor or resistors from being in the parallel arrangement with $R_{L1}$, which increases $V_{MON}$ back to its original value. In this way, the full range of the ADC is exploited while avoiding ADC conversion errors to enable a wide received power range to be monitored with very high accuracy.

Figure 1:
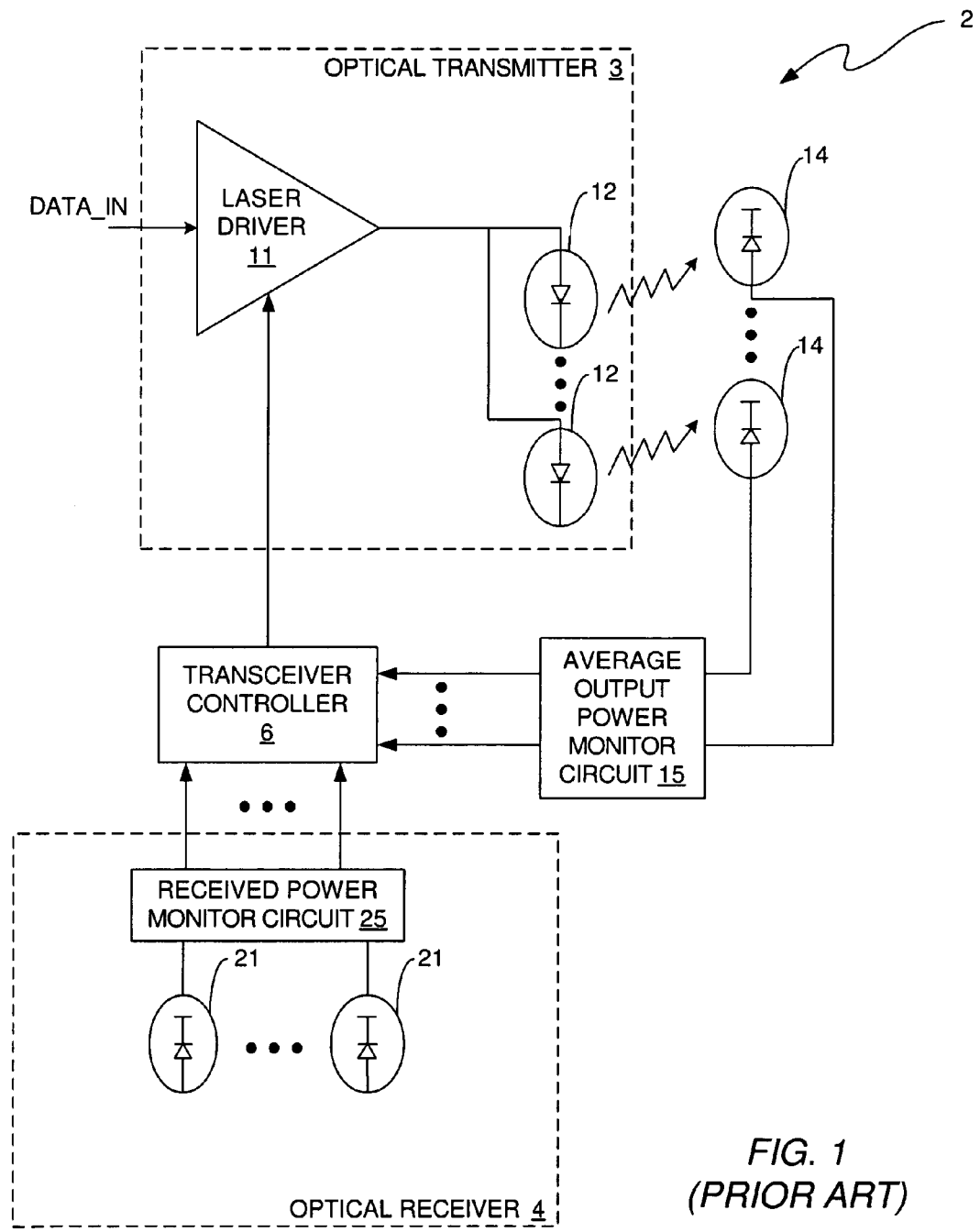
FIG. 1 illustrates a block diagram of a known parallel optical transceiver module currently used in optical communications.
Figure 2:
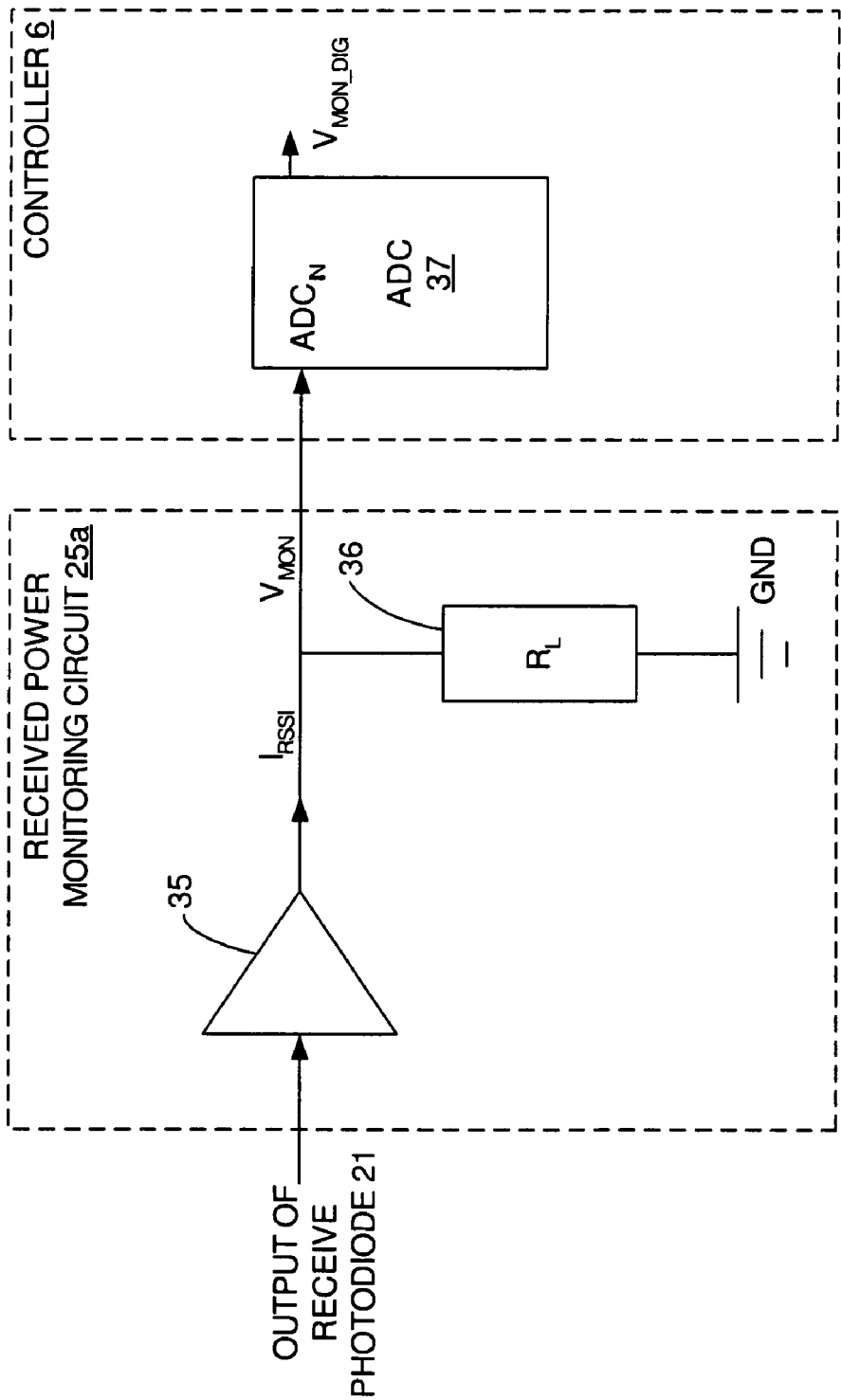
FIG. 2 illustrates a block diagram of a portion of the received power monitoring circuit shown in FIG. 1 for processing the analog electrical current signals produced by one of the receive photodiodes shown in FIG. 1.
Figure 3:
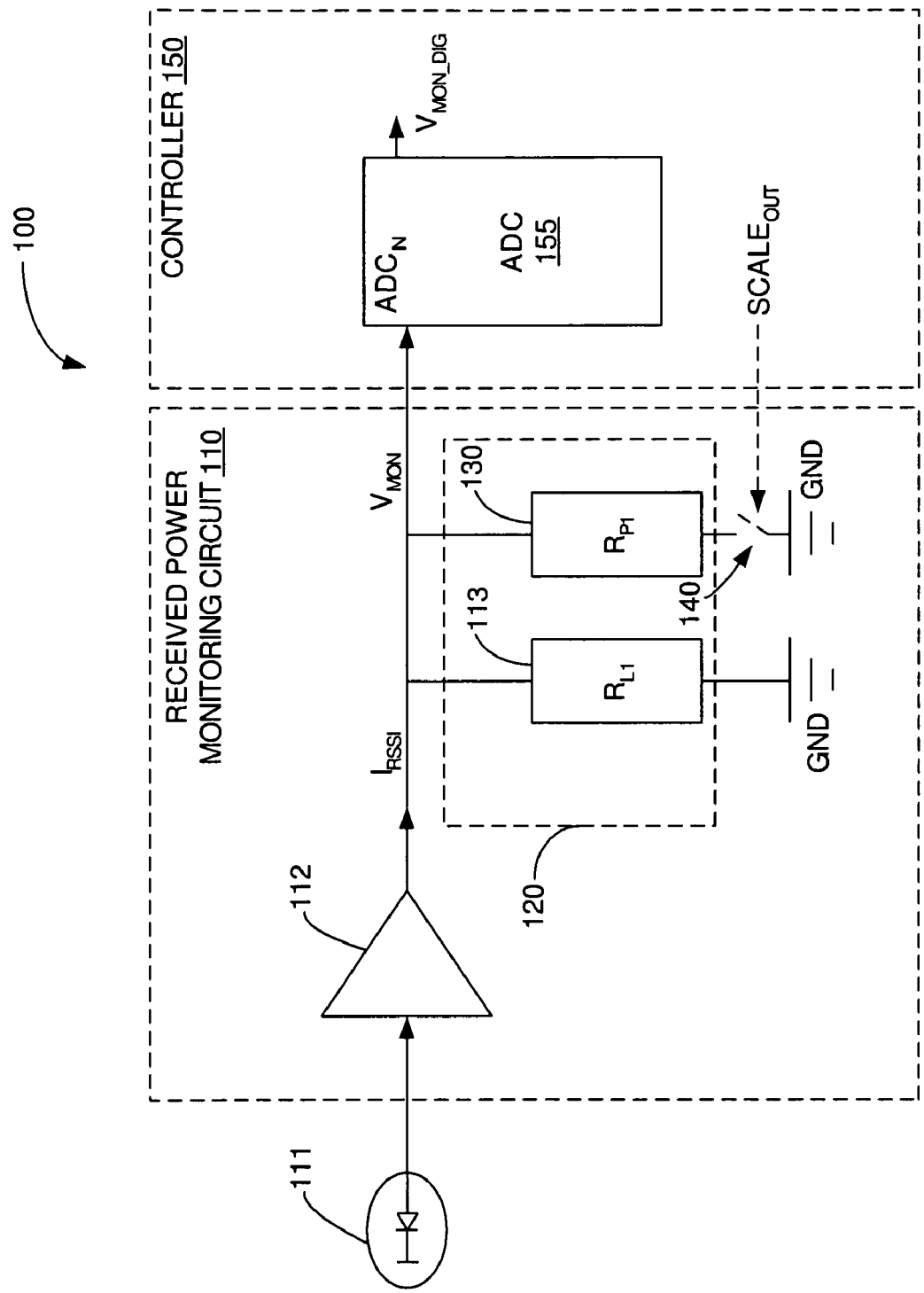
FIG. 3 illustrates a block diagram of the received power monitoring apparatus in accordance with an embodiment.

FIG. 3 illustrates a block diagram of the received power monitoring apparatus 100 in accordance with an embodiment. The apparatus 100 includes a received power monitoring (RPM) circuit 110 and a controller IC 150. In accordance with this embodiment, the controller IC is of the type that is typically included in an optical transceiver or optical receiver for controlling the operations thereof. The apparatus 100 is suitable for use in an optical transceiver that includes optical transmitter and optical receiver components, and in an optical receiver that includes only optical receiver components. In other words, the optical receiver that incorporates the apparatus 100 may be a stand-alone optical receiver or an optical receiver portion of an optical transceiver.

The RPM circuit 110 includes an amplifier 112, which may be part of a TIA, for example, and an adjustable resistor circuit 120. The adjustable resistor circuit 120 includes a first resistor, $R_{L1}$, 113, a second resistor, $R_{P1}$, 130, and a switching element 140. As will be described below in more detail, the functionality of the switching element 140 may be implemented within the controller IC 150. For ease of illustration and discussion, the switching element 140 is shown as being part of the RPM circuit 110. The amplifier 112 receives an electrical current signal produced by an optical detector 111 (e.g., a photodiode 111) in response to light output from an end of an optical fiber (not shown) that impinges on the optical detector 111. The amplifier 112 amplifies the electrical current signal and outputs an amplified electrical current signal, $I_{RSSI}$. The resistors $R_{L1}$ 113 and $R_{P1}$ 130 are in parallel with each other when the switching element 140 is closed. Thus, when the switching element 140 is closed, the parallel resistance, $R_{L2}$ is equal to $R_{L1}//R_{P1}$, or $(R_L \times R_{P1})/(R_L + R_{P1})$. When the switching element 140 is open, the resistor $R_{P1}$ is effectively removed from the circuit 100. When the switching element 140 is closed, $V_{MON}$ is calculated by the following equation:

$$V_{MON} = I_{RSSI} \times R_{L2} \qquad \text{(Equation 1)}$$

When the switching element 140 is open, $V_{MON}$ is calculated by the following equation:

$$V_{MON} = I_{RSSI} \times R_{L1} \qquad \text{(Equation 2)}$$

The controller IC 150 performs an RPM algorithm that sends a control signal, $Scale_{Out}$, to the port to which the switching element 140 is connected that causes the switching element 140 to either open or close. The RPM algorithm sets the state of the control signal $Scale_{Out}$ based, at least in part, on the value of digitized value of $V_{MON}$, $V_{MON\_DIG}$, as will be described below in detail with reference to FIGS. 4 and 5. The switching element 140 may be, for example, a single transistor or a combination of transistors connected in series with the resistor $R_{P1}$. The transistor or combination of transistors that is used for this purpose may be, for example, one or more Complementary Metal Oxide Semiconductor (CMOS) transistors. For illustrative purposes, it will be assumed that a single transistor is used as the switching element 140. Therefore, assuming the switching element 140 is a single transistor, when the controller IC 150 asserts $Scale_{Out}$, the transistor is activated, thereby causing the resistor $R_{P1}$ to be connected to ground, GND. In this condition, the resistors $R_{L1}$ and $R_{P1}$ are connected in parallel, and thus the value of $V_{MON}$ is governed by Equation 1. When the controller IC 150 deasserts $Scale_{Out}$, the transistor is deactivated, thereby preventing the resistor $R_{P1}$ from being connected to GND. In this condition, the resistor $R_{P1}$ is removed from the circuit 110, and thus the value of $V_{MON}$ is governed by Equation 2.

The RPM algorithm performed by the controller IC 150 enables a single ADC 155 of the controller IC 150 to be used to handle a very wide range of received optical power values represented by the values of $V_{MON}$. The RPM algorithm processes the multi-bit digital value, $V_{MON\_DIG}$, output from the ADC 155, and determines, based at least in part on the value of $V_{MON\_DIG}$, whether the switching element 140 should be in the open state or in the closed state. If the RPM algorithm determines that the switching element 140 should be in the closed state, the RPM algorithm causes the control signal $Scale_{Out}$ to be asserted. If the RPM algorithm determines that the switching element 140 should be in the opened state, the RPM algorithm causes $Scale_{out}$ to be deasserted.

In addition, if the RPM algorithm causes $Scale_{Out}$ to be asserted, then the RPM algorithm also causes the resulting value of $V_{MON\_DIG}$ to be multiplied by a scaling factor equal to $R_{L1}/R_{L2}$ to compensate for the fact that the value of $V_{MON}$ that is input to the ADC 155 is essentially reduced by an equal amount when $R_{L2}$ is used instead of $R_{L1}$. Multiplying the value of $V_{MON\_DIG}$ by this scaling factor is equivalent to increasing the number of bits, N, in the output of the ADC 155 because the converted value range is effectively from 0 to $(2^N-1)*(R_{L1}/R_{L2})$ when $R_{L2}$ is used. When $R_{L1}$ is used, it is not necessary to multiply the value of $V_{MON\_DIG}$ by the scaling factor. Thus, the RPM algorithm ensures that the full range of the ADC 155 is exploited (when $R_{L2}$ is used) while also ensuring that the input value to the ADC 155, $V_{MON}$, is not so small that it causes significant conversion errors to occur in the ADC 155 (when $R_{L1}$ is used). In this way, a very wide range of received power can be measured with an N-bit ADC 155 of the controller 150, with performance equivalent to an ADC that uses a number of bits higher than N, through the use of the scaling factor ($R_{L1}/R_{L2}$).

While the switching element 140 may be conceptualized as a physical switch, such as a CMOS transistor, for example, modern CMOS controller ICs have configurable input/output (I/O) ports that can be configured to provide the switching functionality. For example, an I/O port may be configured to be either in a digital LOW state, a digital HIGH state, or in a high impedance state. In the digital LOW state, a pull down CMOS transistor (not shown) of the controller IC will be connected to ground with a series resistance of about 40 to 60 ohms. In the high impedance state, the port has a low leakage current that causes the pull down transistor of the port to essentially behave as an open circuit. Therefore, placing the port connected to resistor $R_{P1}$ 130 in the digital LOW state will cause the resistor $R_{P1}$ 130 to be placed in parallel with the resistor $R_{L1}$ 113, in which case $V_{MON}$ is calculated by Equation 1. Placing the port connected to resistor $R_{P1}$ 130 in the high impedance state will prevent the resistor $R_{P1}$ 130 from being placed in parallel with the resistor $R_{L1}$, in which case $V_{MON}$ is calculated by Equation 2. In this example, assertion of $Scale_{Out}$ corresponds to placing the port in the digital LOW state and deassertion of $Scale_{Out}$ corresponds to placing the port in the high impedance state.

Figure 4:
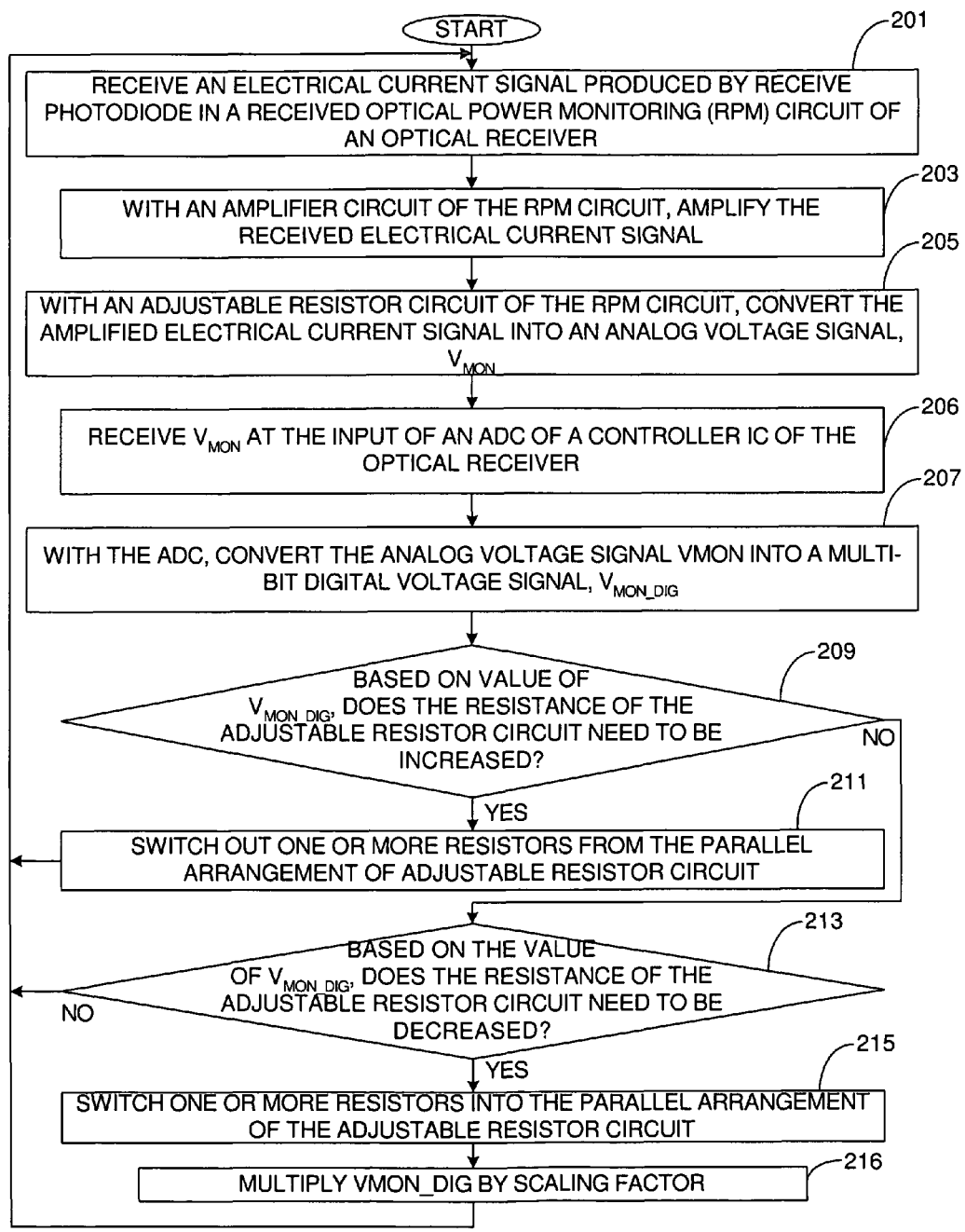
FIG. 4 illustrates a flowchart that represents the method in accordance with an illustrative embodiment for monitoring received optical power in an optical receiver.

FIG. 4 illustrates a flowchart that represents the method in accordance with an embodiment for monitoring received optical power in an optical receiver. An electrical current produced by an optical detector (e.g., a photodiode) in response to light impinging thereon is received in an RPM circuit, as indicated by block 201. An amplifier circuit of the RPM circuit amplifies the electrical current signal and outputs an amplified electrical current signal to an adjustable resistor circuit of the RPM circuit, as indicated by block 203. The adjustable resistor circuit has one or more resistors that provide a total resistance that can be increased and decreased by switching one or more additional resistors out of and into, respectively, a parallel arrangement of the adjustable resistor circuit. The adjustable resistor circuit receives the amplified electrical current signal output from the amplifier circuit and converts the amplified electrical current signal into an analog monitoring voltage signal, $V_{MON}$, as indicated by block 205. The analog $V_{MON}$ signal represents the received optical power detected by the receive photodiode.

The analog $V_{MON}$ signal is input to an input port of an ADC of a controller IC of the optical receiver, as indicated by block 206. The ADC converts the analog $V_{MON}$ signal into a multi-bit digital value, $V_{MON\_DIG}$, as indicated by block 207. The controller IC performs an RPM algorithm that processes the $V_{MON\_DIG}$ value and determines, based on the $V_{MON\_DIG}$ value, whether or not the adjustable resistor circuit of the RPM circuit needs to be adjusted to increase the resistance of the adjustable resistor circuit, as indicated by block 209. If a determination is made at block 209 that the resistance of the adjustable resistor circuit does not need to be increased, then the process proceeds to block 213. If a determination is made at block 209 that the resistance of the adjustable resistor circuit needs to be increased, then the process proceeds to block 211 where the resistance of the adjustable resistor circuit is increased by switching out one or more resistors from the parallel resistor arrangement of the adjustable resistor circuit. The process then returns to block 201.

If a determination is made at block 209 that the resistance of the adjustable resistor circuit does not need to be increased, then a determination is made at block 213 as to whether the resistance of the adjustable resistor circuit needs to be decreased. If, so, then the process proceeds to block 215 where the resistance is decreased by switching one or more additional resistors into the adjustable resistor circuit in parallel with the existing resistor or resistors of the adjustable resistor circuit. Decreasing the resistance in this manner decreases the amplitude of the analog $V_{MON}$ signal received at the input port of the ADC. This decrease in the amplitude of the analog $V_{MON}$ signal results in a decrease in the value of the multi-bit digital signal $V_{MON\_DIG}$. To offset this decrease in the value of $V_{MON\_DIG}$, the process then proceeds to block 216 where the RPM algorithm multiplies the $V_{MON\_DIG}$ value by the aforementioned scaling factor, $R_{L1}/R_{L2}$. The process then returns to block 201 where the RPM algorithm continues to monitor the received optical power.

In accordance with another illustrative embodiment, the RPM algorithm uses two threshold levels in determining whether or not one or more resistors should be switched into or out of the parallel resistor arrangement shown in FIG. 3. Specifically, a high threshold level, $THR_H$, and a low threshold level, $THR_L$ are used for this purpose. The RPM algorithm in accordance with this embodiment will be described with reference to FIGS. 3 and 5.

Figure 5:
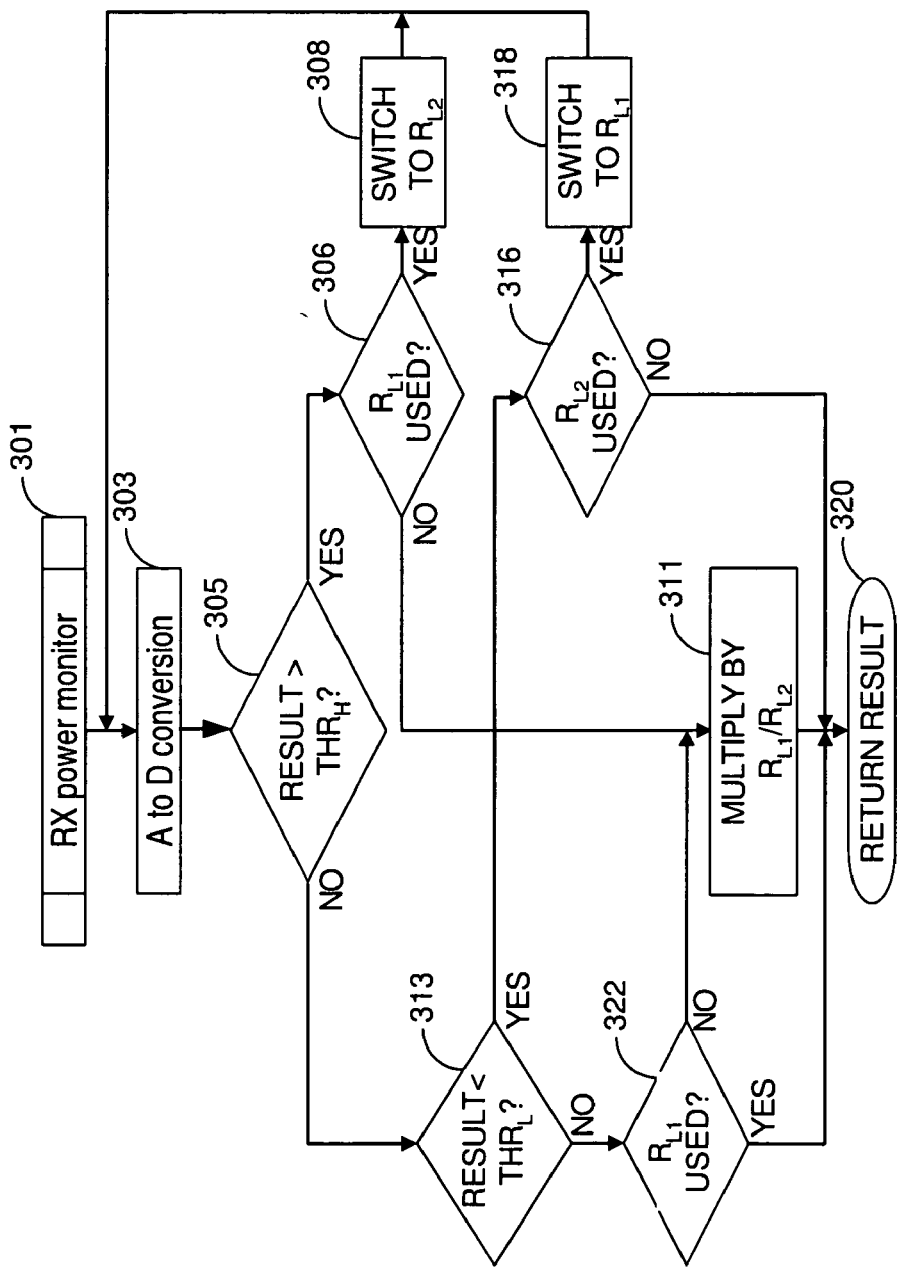
FIG. 5 illustrates a flowchart that represents the method in accordance with another illustrative embodiment for monitoring received optical power in an optical receiver.

FIG. 5 illustrates a flowchart that represents the manner in which the controller IC 150 performs the RPM algorithm using these two threshold levels. Block 301 represents the process performed by the RPM circuit 110 (FIG. 3) to obtain the analog $V_{MON}$ value that is input to the ADC 155. Block 303 represents the process performed by the ADC 155 to convert the analog $V_{MON}$ value into the multi-bit digital value, $V_{MON\_DIG}$. At block 305, the RPM algorithm compares the current $V_{MON\_DIG}$ value to $THR_H$ to determine whether $V_{MON\_DIG}$ is greater than $T_{HRH}$. If so, then this means that $R_{L2}$ needs to be used. Therefore, the process proceeds to block 306 where a determination is made as to whether or not $R_{L1}$ is currently being used (i.e., $R_{L2}$ not currently being used). If so, the process proceeds to block 308 where $SCALE_{OUT}$ is asserted to close the switching element 140 so that $R_{L2}$ is used instead of $R_{L1}$. The process then returns to block 303 where the ADC 155 performs the conversion using the analog $V_{MON}$ value obtained when $R_{L2}$ is used.

If it is determined at blocks 305 and 306 that the current value of $VM_{ON\_DIG}$ is greater than $THR_H$ and that $R_{L1}$ is not currently being used, then this means that $R_{L2}$ was used to produce the current value of $V_{MON\_DIG}$. In this case, the process proceeds from block 306 to block 311 where the current value of $V_{MON\_DIG}$ is multiplied by the scaling factor $R_{L1}/R_{L2}$. The scaled value is then used by the controller IC 150 as the received optical power value. Therefore, the process proceeds to block 320 where the result is returned to the controller IC 150.

If it is determined at block 305 that the current value of $V_{MON\_DIG}$ is not greater than $THR_H$, then the process proceeds to block 313 where a determination is made as to whether or not the current value of $V_{MON\_DIG}$ is less than $THR_L$. If so, then this means that $R_{L1}$ should be used. Therefore, the process proceeds to block 316 where a determination is made as to whether or not $R_{L2}$ is currently being used. If so, the process proceeds to block 318 where $SCALE_{OUT}$ is deasserted to open the switching element 140 so that $R_{L1}$ is used instead of $R_{L2}$. The process then returns to block 303 where the ADC 155 performs the conversion using the analog $V_{MON}$ value obtained when $R_{L1}$ is used.

If it is determined at blocks 313 and 316 that the current value of $V_{MON\_DIG}$ is less than $THR_L$ and that $R_{L2}$ was not used to produce the current value of $V_{MON\_DIG}$, then this means that $R_{L1}$ was used to produce the current value of $V_{MON\_DIG}$. Therefore, since $V_{MON\_DIG}$ does not need to be scaled when $R_{L1}$ is used, the process proceeds to block 320 where the current value of $V_{MON\_DIG}$ is returned to the controller IC 150 as the received optical power value.

If it is determined at block 313 that the current value of $V_{MON\_DIG}$ is not less than $THR_L$, then the process proceeds to block 322 where a determination is made as to whether or not $R_{L1}$ was used to produce the current value of $V_{MON\_DIG}$. If it is determined at block 322 that $R_{L1}$ was not used to produce the current value of $V_{MON\_DIG}$, then this means that $R_{L2}$ was used. In this case, the process proceeds to block 311 where the current value of $V_{MON\_DIG}$ is multiplied by the scaling factor $R_{L1}/R_{L2}$. The process then proceeds to block 320 where the result is returned. If it is determined at block 322 that $R_{L1}$ was used to produce the current value of $V_{MON\_DIG}$, then this means that $V_{MON\_DIG}$ does not need to be scaled. Therefore, in this case, the process proceeds to block 320 where the value of $V_{MON\_DIG}$ is returned.

The process represented by the flowchart shown in FIG. 5 enables the frequent switching of the resistive loads $R_{L1}$ and RL2 to be avoided through the use of the decision blocks 306, 316 and 322. To enable the RPM algorithm to be performed in the manner depicted in FIG. 5, the following condition should be met: $(THR_L \times R_{L1}) < (THR_H \times R_{L2})$. One way to ensure that this condition is met, is to first select desired values for $THR_H$, $R_{L1}$ and $R_{L2}$, and then, having selected those values, to select a value of $THR_L$ that ensures that the above condition is met.

It should be noted that a variety of modifications can be made to the RPM algorithms represented by the flowcharts shown in FIGS. 4 and 5. The flowcharts shown in FIGS. 4 and 5 are merely examples of suitable RPM algorithm designs that enable the goals of the invention to be achieved. Persons of ordinary skill in the art will understand that a variety of modifications may be made to the RPM algorithms represented by these flowcharts and that all such modifications are within the scope of the invention.

Figure 6:
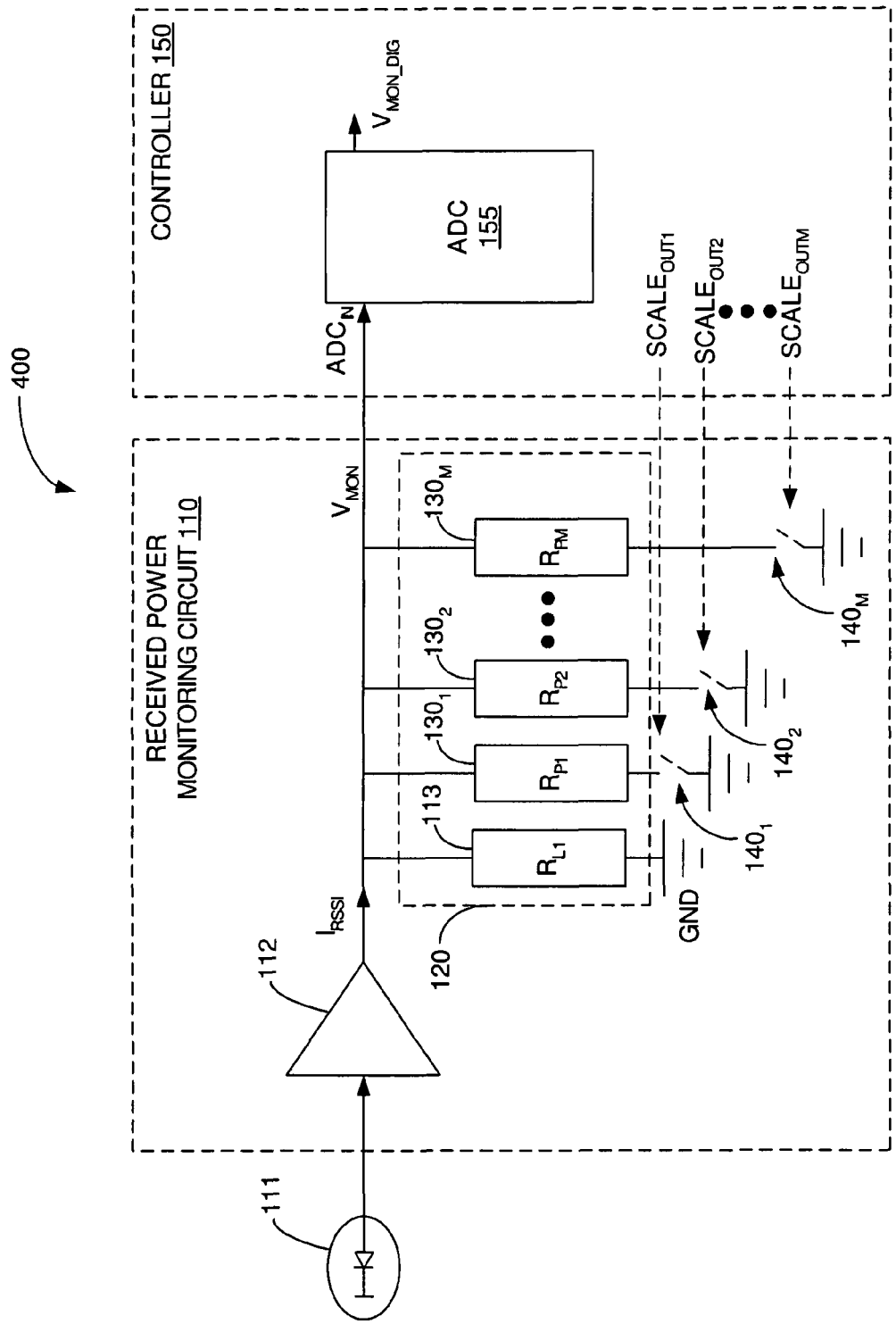
FIG. 6 illustrates a block diagram of the received power monitoring apparatus in accordance with another illustrative embodiment in which multiple resistors may be switched into and out of the parallel resistor arrangement.

With reference again to FIG. 3, the concepts and principles described with reference to FIG. 3 are also applicable to embodiments in which more than one resistor is switched in or out of the parallel resistor arrangement shown in FIG. 3. FIG. 6 illustrates a block diagram of the received power monitoring apparatus 400 in accordance with another illustrative embodiment in which multiple resistors may be switched into and out of the parallel resistor arrangement. In FIGS. 3 and 6, like numerals represent like elements. The apparatus 400 shown in FIG. 6 is essentially identical to the apparatus 100 shown in FIG. 3 with the exception that the apparatus 400 includes M resistors $R_{P1}$ through $R_{PM}$, labeled with reference numerals $130_1$ through $130_M$, respectively, where M is a positive integer that is equal to or greater than 1.

Each of the resistors $R_{P1}$ through $R_{PM}$ is controlled by control signals, $Scale_{Out1}$-$Scale_{OutM}$, respectively. When one of the respective control signals $Scale_{Out1}$-$Scale_{OutM}$ is asserted, a respective one of the switching elements, $140_1$-

$140_M$, is closed, thereby placing one or more of the corresponding resistors $R_{P1}$-$R_{PM}$ in parallel with the resistor $R_{L1}$. When one of the respective control signals $Scale_{Out1}$-$Scale_{OutM}$ is deasserted, a respective one of the switching elements, $140_1$-$140_M$, is opened, thereby removing one or more of the corresponding resistors $R_{P1}$-$R_{PM}$ from the parallel arrangement with the resistor $R_{L1}$. As with the embodiment described above with reference to FIG. 3, the switching elements $140_1$-$140_M$ may be external or internal to the controller IC 150. For example, the switching elements $140_1$-$140_M$ may be respective transistors that are in series with the respective resistors $R_{P1}$-$R_{PM}$ and connected to M respective ports of the controller IC 150. Alternatively, M ports of the controller IC 150 may be configured in the manner described above with reference to FIG. 3. In the latter case, placing the respective port in the digital LOW state causes a respective pull down transistor of the controller IC 140 to be connected to ground, and placing the respective port in a high impedance state creates an open circuit at the location of the respective pull down transistor. Thus, in the digital LOW state, the respective one of the resistors $R_{P1}$-$R_{PM}$ is connected to ground and is in parallel with the resistor $R_{L1}$, whereas in the high impedance state, an open circuit exists between the respective one of the resistors $R_{P1}$-$R_{PM}$ and ground such that the respective resistor is removed from the parallel arrangement with the resistor $R_{L1}$.

At any given time, one or more of the resistors $R_{P1}$-$R_{PM}$ may be switched into parallel with the resistor $R_{L1}$. When one or more of the resistors $R_{P1}$ through $R_{PM}$ are switched into parallel with resistor $R_{L1}$, the equivalent parallel resistance, $R_{L2}$, is calculated in the manner described above with reference to FIG. 3, and the corresponding value of $V_{MON}$ is given by Equation 1. When all resistors $R_{P1}$ through $R_{PM}$ are not in parallel with resistor $R_{L1}$, the corresponding value of $V_{MON}$ is given by Equation 2. The only condition on the $R_{L1}$ and $R_{L2}$ is that $R_{L2} < R_{L1}$. The manner in which either of the RPM algorithms described above with reference to FIGS. 4 and 5 may be modified to accommodate the use of the additional resistors $R_{P1}$ through $R_{PM}$ will be understood by persons of ordinary skill in the art in view of the description provided above with reference to FIGS. 4 and 5.

The RPM algorithm described above is typically implemented in hardware (i.e., combinational logic) implemented in the controller IC 150. However, the RPM algorithm may instead be implemented in software in the controller IC 150, or may be implemented in the controller IC 150 as a combination of hardware, software, and/or firmware. Any computer instructions that are needed for carrying out the RPM algorithm may be stored in any suitable computer-readable medium, such as, for example, a solid state random access memory (RAM) device, read-only memory (ROM) device, a programmable ROM (PROM), an erasable PROM (EPROM), a flash memory device, etc.

It should be noted that the invention has been described with respect to illustrative embodiments for the purpose of describing the principles and concepts of the invention. The invention is not limited to these embodiments. For example, while the invention has been described with reference to using a particular RPM circuit design, the invention is not limited to this particular RPM circuit design. For example. As will be understood by those skilled in the art in view of the description being provided herein, many modifications may be made to the embodiments described herein while still achieving the goals of the invention, and all such modifications are within the scope of the invention.

What is claimed is:

1. A received power monitoring (RPM) apparatus for use in an optical receiver for monitoring optical power received in the optical receiver, the apparatus comprising:
an amplifier circuit configured to receive an electrical signal produced by an optical detector in response to light received by the optical detector, the amplifier circuit being configured to amplify the electrical signal and to output the amplified electrical signal;
an adjustable resistor circuit configured to receive the amplified electrical signal at an input terminal of the adjustable resistor circuit and to produce an analog voltage signal, $V_{MON}$, at an output terminal of the adjustable resistor circuit, the adjustable resistor circuit providing a resistance value that is adjustable between at least a first resistance value, $R_{L1}$, and a second resistance value, $R_{L2}$, wherein $R_{L1}$ is greater than $R_{L2}$; and
a controller having an analog-to-digital converter (ADC), the ADC having an input port that receives the analog $V_{MON}$ signal and an output port that outputs a multi-bit digital value, $V_{MON\_DIG}$, the ADC having ADC circuitry that converts the analog $V_{MON}$ signal into the digital $V_{MON\_DIG}$ value that is output from the output port of the ADC, wherein the controller is configured to perform a received power monitoring (RPM) algorithm that analyzes the digital $V_{MON\_DIG}$ value output from the output port of the ADC to determine whether or not the digital $V_{MON\_DIG}$ value indicates that the resistance value provided by the adjustable resistor circuit needs to be adjusted, wherein if the RPM algorithm determines that the digital $V_{MON\_DIG}$ value indicates that the resistance value of the adjustable resistor circuit needs to be adjusted, the RPM algorithm causes the adjustable resistor circuit to be adjusted to provide one of the first resistance value $R_{L1}$ and the second resistance value $R_{L2}$, wherein adjusting the resistance value of the adjustable resistor circuit between one of the first resistance value $R_{L1}$ and the second resistance value $R_{L2}$ results in an amplitude of the analog $V_{MON}$ signal being adjusted between a first analog $V_{MON}$ value and a second analog $V_{MON}$ value, respectively, wherein the first analog $V_{MON}$ value is greater than the second analog $V_{MON}$ value, and wherein the ADC circuitry of the ADC converts the first and second analog $V_{MON}$ values into first and second digital $V_{MON\_DIG}$ values, respectively, the first digital $V_{MON\_DIG}$ value being greater than the second digital $V_{MON\_DIG}$ value, and wherein the controller further comprises scaling circuitry that multiplies the second digital $V_{MON\_DIG}$ value by a scaling factor greater than one.

2. The RPM apparatus of claim 1, wherein the RPM algorithm adjusts the resistance value of the adjustable resistor circuit by performing a switching operation that switches the configuration of the adjustable resistor circuit between at least a first configuration in which the adjustable resistor circuit provides the first resistance value $R_{L1}$ and a second configuration in which the adjustable resistor circuit provides the second resistance value $R_{L2}$.

3. The RPM apparatus of claim 1, wherein the scaling factor is equal to the first resistance value divided by the second resistance value.

4. The RPM apparatus of claim 1, wherein the first resistance value $R_{L1}$ corresponds to at least a first resistor having a first terminal and a second terminal, the first terminal being connected to the input terminal of the adjustable resistor circuit and the second terminal being connected to a ground terminal, and wherein the second resistance value $R_{L2}$ corresponds to a parallel arrangement of at least a second resistor electrically connected in parallel with the first resistor.

5. The RPM apparatus of claim 4, wherein the RPM algorithm performed by the controller performs a switching operation that switches the second resistor into or out of the parallel arrangement with the first resistor based on whether or not the RPM algorithm determines that the digital $V_{MON\_DIG}$ value indicates that the resistance value provided by the adjustable resistor circuit needs to be adjusted, wherein the RPM algorithm determines whether or not the digital $V_{MON\_DIG}$ value indicates that the resistance value needs to be adjusted by comparing the digital $V_{MON\_DIG}$ value to at least a first threshold value, wherein if the RPM algorithm determines that the digital $V_{MON\_DIG}$ value is above the first threshold value, the RPM algorithm switches the second resistor into the parallel arrangement with the first resistor to adjust the resistance value of the adjustable resistor circuit such that the adjustable resistor circuit provides the second resistance value $R_{L2}$.

6. The RPM apparatus of claim 4, wherein the RPM algorithm performed by the controller performs a switching operation that switches the second resistor into or out of the parallel arrangement with the first resistor based on whether or not the RPM algorithm determines that the digital $V_{MON\_DIG}$ value indicates that the resistance value provided by the adjustable resistor circuit needs to be adjusted, wherein the RPM algorithm determines whether or not the digital $V_{MON\_DIG}$ value indicates that the resistance value needs to be adjusted by comparing the digital $V_{MON\_DIG}$ value to a first threshold value and to a second threshold value, the first threshold value being greater than the second threshold value, wherein if the RPM algorithm determines that the digital $V_{MON\_DIG}$ value is above the first threshold value, the RPM algorithm switches the second resistor into the parallel arrangement with the first resistor to adjust the resistance value of the adjustable resistor circuit such that the adjustable resistor circuit provides the second resistance value $R_{L2}$, and wherein if the RPM algorithm determines that the digital $V_{MON\_DIG}$ value is below the second threshold value, the RPM algorithm switches the second resistor out of the parallel arrangement with the first resistor to adjust the resistance value of the adjustable resistor circuit such that the adjustable resistor circuit provides the first resistance value $R_{L1}$.

7. A method for use in an optical receiver for monitoring optical power received in the optical receiver, the method comprising:
in an amplifier circuit, receiving an electrical signal produced by an optical detector in response to light received by the optical detector;
in the amplifier circuit, amplifying the electrical signal and outputting the amplified electrical signal;
in an adjustable resistor circuit, receiving the amplified electrical signal at an input terminal of the adjustable resistor circuit and producing an analog voltage signal, $V_{MON}$, at an output terminal of the adjustable resistor circuit, wherein the adjustable resistor circuit provides a resistance value that is adjustable between at least a first resistance value, $R_{L1}$, and a second resistance value, $R_{L2}$, wherein $R_{L1}$ is greater than RL2; and
in a controller having an analog-to-digital converter (ADC), receiving the analog $V_{MON}$ signal at an input port of the ADC and converting the analog $V_{MON}$ signal into a multi-bit digital $V_{MON\_DIG}$ value;
outputting the multi-bit digital $V_{MON\_DIG}$ value from an output port of the ADC;
in the controller, performing a received power monitoring (RPM) algorithm that analyzes the digital $V_{MON\_DIG}$ value output from the output port of the ADC to determine whether or not the digital $V_{MON\_DIG}$ value indicates that the resistance value provided by the adjustable resistor circuit needs to be adjusted, wherein if the RPM algorithm determines that the digital $V_{MON\_DIG}$ value indicates that the resistance value needs to be adjusted, the RPM algorithm causes the adjustable resistor circuit to be adjusted to provide one of the first resistance value $R_{L1}$ and the second resistance value $R_{L2}$, wherein adjusting the resistance value of the adjustable resistor circuit between one of the first resistance value $R_{L1}$ and the second resistance value $R_{L2}$ results in an amplitude of the analog $V_{MON}$ signal being adjusted between a first analog $V_{MON}$ value and a second analog $V_{MON}$ value, respectively, wherein the first analog $V_{MON}$ value is greater than the second analog $V_{MON}$ value, and wherein the ADC circuitry of the ADC converts the first and second analog $V_{MON}$ values into first and second digital $V_{MON\_DIG}$ values, respectively, the first digital $V_{MON\_DIG}$ value being greater than the second digital $V_{MON\_DIG}$ value; and
in the controller, scaling the second digital value $V_{MON\_DIG}$ by multiplying the second digital $V_{MON\_DIG}$ value by a scaling factor greater than one.

8. The method of claim 7, wherein the RPM algorithm adjusts the resistance value of the adjustable resistor circuit by performing a switching operation that switches the configuration of the adjustable resistor circuit between at least a first configuration in which the adjustable resistor circuit provides the first resistance value $R_{L1}$ and a second configuration in which the adjustable resistor circuit provides the second resistance value $R_{L2}$.

9. The method of claim 7, wherein the scaling factor is equal to the first resistance value divided by the second resistance value.

10. The method of claim 7, wherein the first resistance value $R_{L1}$ corresponds to at least a first resistor having a first terminal and a second terminal, the first terminal being connected to the input terminal of the adjustable resistor circuit and the second terminal being connected to a ground terminal, and wherein the second resistance value $R_{L2}$ corresponds to a parallel arrangement of at least a second resistor electrically connected in parallel with the first resistor having a first terminal and a second terminal.

11. The method of claim 10, wherein the RPM algorithm performed by the controller performs a switching operation that switches the second resistor into or out of the parallel arrangement with the first resistor based on whether or not the RPM algorithm determines that the digital $V_{MON\_DIG}$ value indicates that the resistance value provided by the adjustable resistor circuit needs to be adjusted, wherein the RPM algorithm determines whether or not the digital $V_{MON\_DIG}$ value indicates that the resistance value needs to be adjusted by comparing the digital $V_{MON\_DIG}$ value to at least a first threshold value, wherein if the RPM algorithm determines that the digital $V_{MON\_DIG}$ value is above the first threshold value, the RPM algorithm switches the second resistor into the parallel arrangement with the first resistor to adjust the resistance value of the adjustable resistor circuit such that the adjustable resistor circuit provides the second resistance value $R_{L2}$.

12. The method of claim 10, wherein the RPM algorithm performed by the controller performs a switching operation that switches the second resistor into or out of the parallel arrangement with the first resistor based on whether or not the RPM algorithm determines that the digital $V_{MON\_DIG}$ value indicates that the resistance value provided by the adjustable resistor circuit needs to be adjusted, wherein the RPM algorithm determines whether or not the digital $V_{MON\_DIG}$ value indicates that the resistance value needs to be adjusted by comparing the digital $V_{MON\_DIG}$ value to a first threshold value and to a second threshold value, the first threshold value being greater than the second threshold value, wherein if the RPM algorithm determines that the digital $V_{MON\_DIG}$ value is above the first threshold value, the RPM algorithm switches the second resistor into the parallel arrangement with the first resistor to adjust the resistance value of the adjustable resistor circuit such that the adjustable resistor circuit provides the second resistance value $R_{L2}$, and wherein if the RPM algorithm determines that the digital $V_{MON\_DIG}$ value is below the second threshold value, the RPM algorithm switches the second resistor out of the parallel arrangement with the first resistor to adjust the resistance value of the adjustable resistor circuit such that the adjustable resistor circuit provides the first resistance value $R_{L1}$.

* * * * *